United States Patent [19]
Brantley, Jr.

[11] 3,958,553
[45] May 25, 1976

[54] SOLAR ENERGY TRAP

[75] Inventor: Lott W. Brantley, Jr., Union Grove, Ala.

[73] Assignee: The United States of America as represented by the Administrator of the National Aeronautics and Space Administration, Washington, D.C.

[22] Filed: Oct. 29, 1974

[21] Appl. No.: 518,544

[52] U.S. Cl. .............................. 126/270; 126/271; 350/293; 350/299
[51] Int. Cl.² ........................................ F24J 3/02
[58] Field of Search ............ 126/270, 271; 237/1 A; 350/96 R, 293, 299; 250/227; 356/44; 310/4

[56]  References Cited
UNITED STATES PATENTS

| | | | |
|---|---|---|---|
| 291,146 | 1/1884 | Calver | 126/271 |
| 294,117 | 2/1884 | Calver | 126/271 |
| 1,951,403 | 3/1934 | Goddard | 126/271 |
| 3,415,588 | 12/1968 | Berreman | 350/179 |
| 3,467,840 | 9/1969 | Weiner | 126/271 |
| 3,869,199 | 3/1975 | Cummings | 126/270 |

FOREIGN PATENTS OR APPLICATIONS

| 524,943 | 1/1930 | Germany | 126/271 |
|---|---|---|---|

*Primary Examiner*—Kenneth W. Sprague
*Assistant Examiner*—James C. Yeung
*Attorney, Agent, or Firm*—Wayland H. Riggins; L. D. Wofford, Jr.; John R. Manning

[57]  ABSTRACT

An apparatus is provided for trapping solar energy emitted from the sun for heating a fluid that could be subsequently used in turbines and the like. The apparatus includes an elongated vertical light pipe having an open end through which the visible spectrum of electromagnetic radiation from the sun passes to strike a tubular absorber carried adjacent the other end thereof. The light pipe has a coated interior surface of a low absorptivity and a high reflectivity at the visible wave lengths and a high absorptivity/emissivity ratio at infrared wave lengths. The tubular absorber has a coating on the surface thereof for absorbing visible wave lengths so as to heat the fluid passing therethrough. Infrared wave lengths are radiated from the tubular absorber back into the light pipe for heating fluid passing through a tubular coil wound thereon.

4 Claims, 3 Drawing Figures

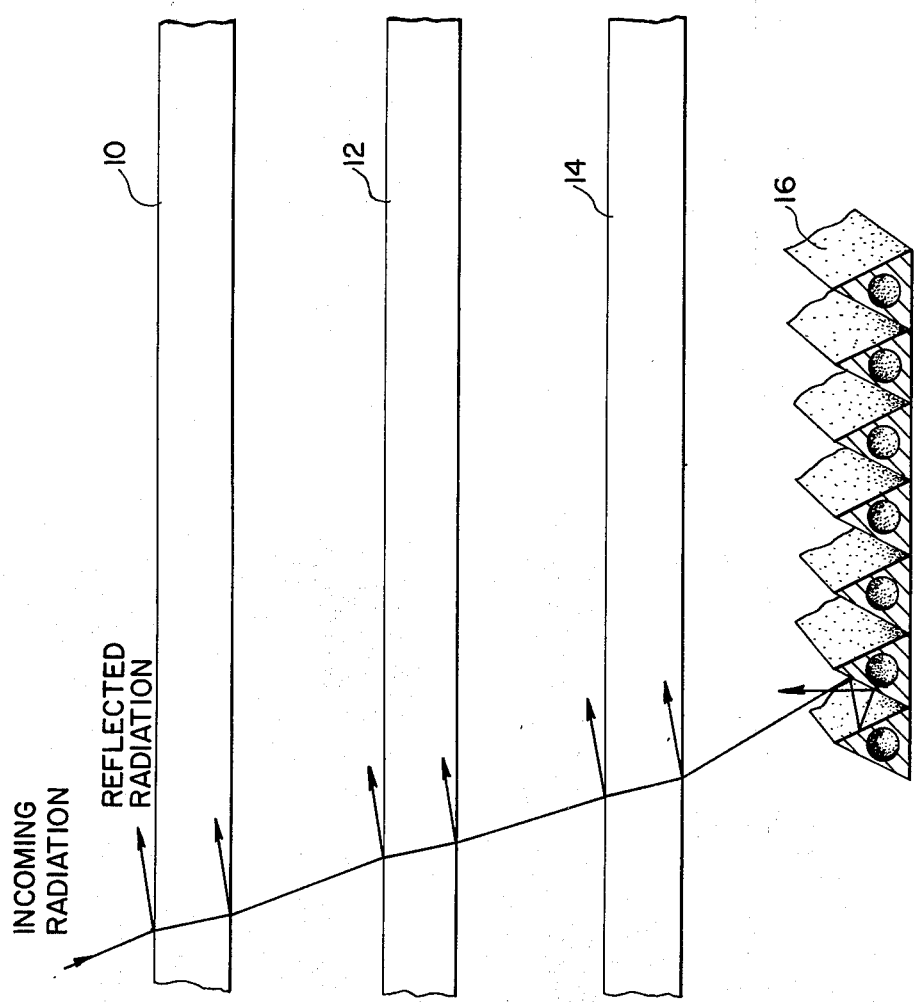

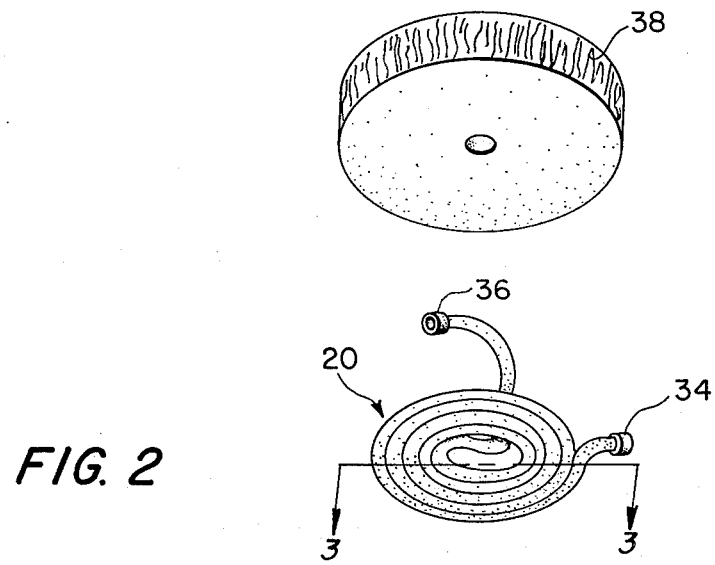
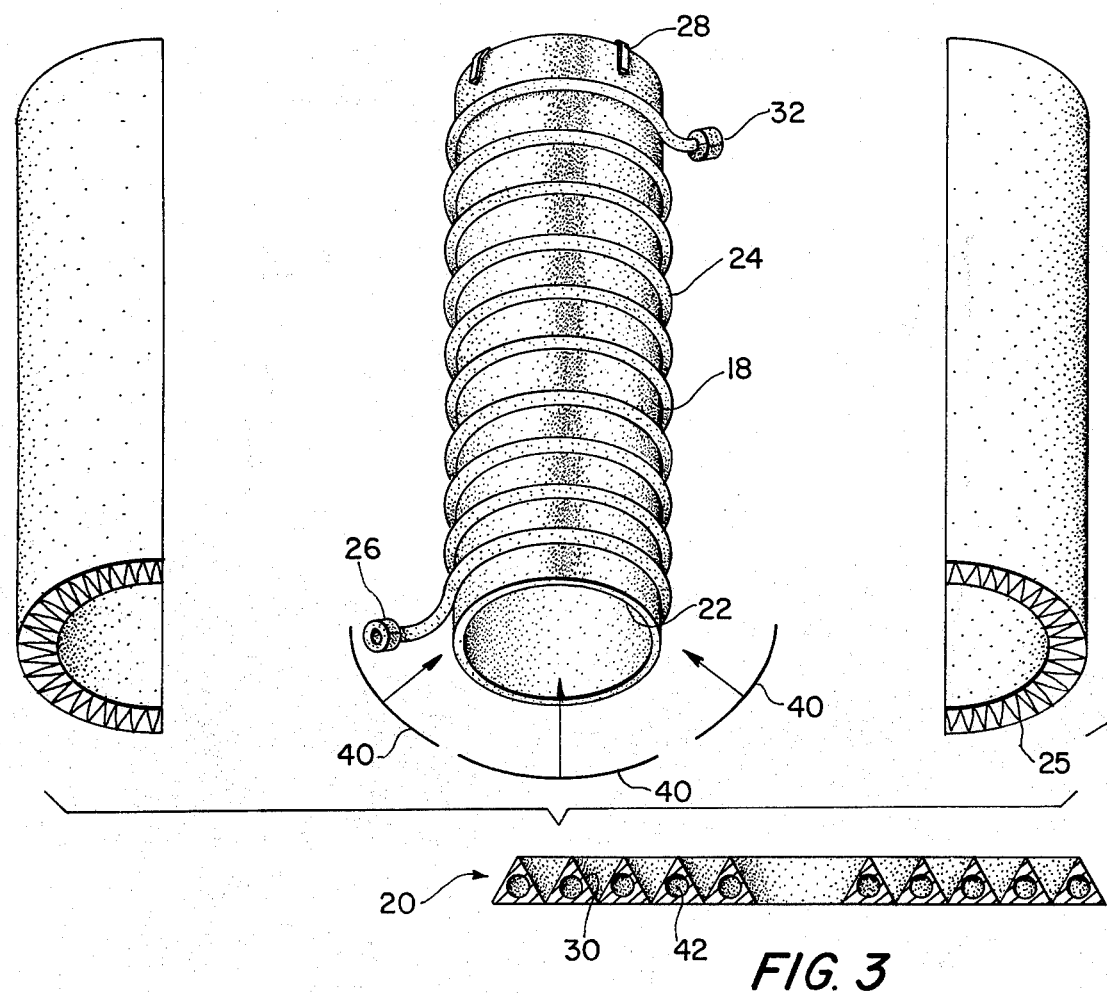

SOLAR ENERGY TRAP

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a solar energy absorber and more particularly to a solar energy absorber which traps the visible spectrum of electromagnetic radiation for heating a fluid.

Heretofore, most systems designed to trap solar energy utilized a system often called "the green house effect." In such systems, visible radiation passes through one or more transparent outer covers and is almost entirely absorbed by an absorptive surface. The absorptive surface was usually constructed of tubing wherein a fluid must pass therethrough for transferring thermal energy absorbed by conduction. The outer cover, while transparent to visible radiation is largely opaque to infrared radiation off of the absorber surface, and hence, absorbs it. It conducts the energy that is not re-radiated to the absorber surface through the outer cover where it is convected or re-radiated away. Examples of such a system are shown in U.S. Pat. No. 1,258,405 and U.S. Pat. No. 2,969,788.

For a given absorptive surface, the amount of energy lost by convection and infrared radiation is a function of the outer cover temperature. Often more than one outer cover is used to reduce the infrared energy reaching and, consequently, heating the final cover.

The use of transparent covers, as described, is not without its penalties however, in a practical absorber system design. The transparent covers reflect some incoming radiation away before it gets to the principal absorptive surfaces. It also absorbs some of the incoming visible radiation. The transparent covers are usually of a brittle material, glass or quartz. Such are consequently hard to handle in assembly and maintenance. Dust adhering to such a cover increases losses.

Another problem with the transparent covers is that if the temperatures rise above a predetermined level, such will often be damaged by breaking or the like.

SUMMARY OF THE INVENTION

It has been found, in accordance with the present invention, that an effective solar energy trap can be constructed for converting the electromagnetic radiation emitted from the sun into thermal energy for heating a fluid. The apparatus includes an elongated tubular light pipe having open ends and positioned so as to receive the solar radiation waves through one end. A reflective coating is provided on the interior surface of the light pipe having a low $\alpha$ (absorption factor) for the visible electromagnetic spectrum and a high $\alpha$ for the infrared electromagnetic spectrum to effectively direct the incoming visible radiation towards a tubular absorber coil carried on the opposite end of the light pipe. The tubular absorber has a coated surface characterized by a high $\alpha$ value and a low $\epsilon$ value for absorbing the visible electromagnetic spectrum and for conversion of the visible radiation into thermal energy. Fluid is conveyed through the tubular coil in heat exchange relationship with the coated surface for heating the fluid.

Accordingly, it is an important object of the present invention to provide an efficient apparatus for absorbing the visible spectrum of electromagnetic radiation generated by the sun.

Another important object of the present invention is to provide a solar energy absorber which has no moving parts and is simple to construct.

Still another important object of the present invention is to provide a solar energy absorber which gradually heats an incoming fluid to a predetermined temperature.

Still another important object of the present invention is to provide a solar energy absorber which traps solar energy which would otherwise be radiated back to the atmosphere producing a highly efficient solar energy absorber.

Still another important object of the present invention is to provide a solar energy trap which can be coupled together with other traps to produce a super heated liquid.

These and other objects will become more readily apparent from reading the following specification and attendant claims.

BRIEF DESCRIPTION OF THE DRAWING

FIG. 1 of the drawing is a schematic diagram illustrating a conventional solar energy absorber, FIG. 2 is an exploded perspective view illustrating a solar energy trap constructed in accordance with the present invention, and FIG. 3 is a sectional view taken along line 3—3 of FIG. 2.

DESCRIPTION OF THE PREFERRED EMBODIMENT

Referring in more detail to FIG. 1 of the drawings, there is illustrated a portion of a conventional solar energy absorber. The solar energy absorber includes three glass plates 10, 12 and 14 stacked one above the other with a vacuum or air layer carried therebetween. Directly below the lower glass plate 14 and spaced therefrom is an absorber member 16. The absorber member 16 may be constructed of triangular shaped tubing coated to absorb the visible spectrum of electromagnetic radiation. Fluid passes through the tubular member 16 for transferring the thermal energy absorbed thereby. One problem with the solar energy absorber shown in FIG. 1 is that since the visible spectrum of the electromagnetic waves have to pass through the three layers of glass, 10, 12 and 14, a certain amount thereof is reflected affecting the efficiency of the overall system. Another problem with the system is that as the energy passes through the glass layers 10, 12 and 14, a certain amount of the energy is absorbed also affecting the efficiency of the system. When dust collects on the glass layers 10, 12 and 14 this problem is enhanced.

Theoretically, in the device shown in FIG. 1, additional glass layers could be stacked one above the other so as to minimize the amount of infrared radiation loss. However, as additional layers are added, such cuts down on the amount of the visible spectrum of electromagnetic radiation passing therethrough to reach the ultimate solar energy absorber.

Referring now to FIG. 2, there is illustrated a solar energy trap which includes an elongated tubular pipe 18. While in this particular application, the tubular shape of the pipe is cylindrical, it is to be understood that in many applications, it may be desirable to make the tubular shape of the pipe square so as to permit positioning of a plurality of pipes closely adjacent to each other in a given area. So as to direct and reflect the solar energy passing through the open end of the bottom of the pipe to an absorber, designated generally at 20, carried on top of the pipe, an inner surface 22 of the light pipe 18 is coated with a surface having a low solar energy absorbing coating which means the coating is characterized by a low absorption factor ($\alpha$). The surface coating is further characterized by its $\alpha/\epsilon$ ratio where $\alpha$ is the absorption factor for solar radiation and $\epsilon$ is the infrared emissivity factor. The significance of the $\alpha/\epsilon$ ratio is that the higher the $\alpha/\epsilon$ ratio, the more efficient the surface coating is for absorbing solar radiation and the less efficient it is for emitting (or absorbing) infrared. Therefore, the surface coating 22 must have a low solar radiation absorption factor, hence a low $\alpha$ and for reasons to be discussed later, a high infrared radiation absorption factor, hence a high $\epsilon$. The actual material used will vary depending on the actual temperatures at which the apparatus is designed to operate. In one particular embodiment, a surface coating designed by the ALCOA Company and marketed under the trademark Alzak is utilized. This material has an $\alpha$ of 0.28 and an $\epsilon$ of 0.78. The light pipe configuration, length to diameter ratio, may be varied. For large ratios, infrared losses are minimized, but that ratio of energy available in the preheater, which includes the portion of the apparatus including the light pipe 18, compared to that available in the absorber 20 is raised, especially for off-axis incoming radiation and light pipe materials with relatively low reflectance. In one particular embodiment, the ratio of the length of the light pipe to the diameter is three to one. The light pipe has a length of twelve inches and a diameter of four inches. In essence, by increasing the length of the light pipe 18, such permits more energy to be absorbed by the light pipe as a result of the reflection taking place therein decreasing the ultimate amount that reaches the absorber 20.

Coiled around the outer surface of the elongated light pipe 18 is a tubular coil 24 which extends from adjacent the top of the pipe to the bottom thereof. A good thermal bond is provided between the tubular pipe 24 and the light pipe 18 such as by welding or braising the tubular pipe 24 to the surface of the light pipe 18. In one particular application, the tubular pipe 24 is constructed of aluminum. A layer of fiberglass insulation 25 encircles the light pipe and tube 24 for minimizing the amount of thermal energy lost from a fluid passing through the tubular pipe 24 that is being heated. The fluid is circulated through pipe 24 using conventional pump means connected to an inlet 26.

The solar spectrum absorber 20 may be attached to the top open end of the light pipe 18 by any suitable means such as clamps 28. The solar spectrum absorber 20 is constructed of a coil of triangular tubular pipe such as best illustrated in FIG. 3. It has a high solar energy absorbing coating 30 on the surface thereof. Hence, the absorptive coating is characterized by a high $\alpha$ value (making it a good absorber of the visible spectrum of electromagnetic radiation) and a low $\epsilon$ value (making it a poor thermal emitter).

One suitable surface is described in United States Patent application, Ser. No. 458,484, entitled "A Panel for Selectively Absorbing Solar Thermal Energy and the Method for Manufacturing the Panel," filed in the name of James R. Lowery, which consists generally of an aluminum substrate coated with a zinc layer having a bright nickle surface thereon with a highly absorptive black nickel plated thereon.

An outlet end 32 of the tubular pipe 24 which extends around the light pipe 18 may be connected to an outer inlet end 34 of the tubular pipes which are coiled to form the absorber. In this case, as can be seen in FIG. 2, an inner end 36 of the solar spectrum absorber coil 20 forms the final outlet for fluid flowing through the end 32 of the tubular pipe 24. In the alternative, a fluid may be pumped separately through tubular pipe 24 and tubular absorber 20 so as to produce a low temperature and high temperature fluid, respectively, using conventional pump means. As fluid passes from the inlet end 34 of the coil 20, it is heated progressively higher so that the fluid reaches its highest temperature at the center of the coil 20 which is also at the outlet 36 of the tube. This is for two reasons. One being that a greater concentration of the solar energy passing through the light pipe strikes adjacent the center of the absorber 20 rather than adjacent the edges. Another reason being that the pipe is in a coil configuration and as the fluid passes from the outer surface towards the interior thereof, it is also heated a certain extent by conduction. In order to prevent escaping of thermal energy from the absorber 12, a circular layer 38 of fiberglass insulation is attached to the top side of the absorber 20.

In operation in order to multiply the effect of the sun's rays a plurality of mirrors 40 are mounted circumferentially around the lower end of the solar energy trap for directing the visible spectrum of the electromagnetic radiation produced by the sun upward towards the longitudinal axis of the light pipe. Some of the waves strike the inner surface 22 of the light pipe and are reflected upwardly to eventually strike the absorptive surface 30 of the absorber 20. Depending on the angle of the incoming waves, a certain percentage of the waves strike the absorber 20 directly. As can be seen, one advantage of the particular apparatus disclosed is that these waves generated by the sun engage the absorber without passing through any glass or the like. As the electromagnetic waves engage the surface 30 of the absorber, thermal energy is transferred to fluid flowing through the tubes extending therethrough. As a result of the triangular shape of the surfaces 30, as best shown in FIG. 3, any waves that are not initially absorbed by the absorber 20 are reflected to engage an adjacent surface for increased absorption. Cylindrical bore 42 is formed within the triangular tube of absorber 20 for conveying the fluid therethrough in a heat exchanging relationship with the absorber.

The infrared waves that are generated by the absorber are directed downwardly towards the surface 22 of the light pipe 18. Due to the particular coating 22 on the light pipe having a high infrared absorption factor $\epsilon$, these infrared waves are absorbed by the light pipe preheating the fluid passing through the wound coil 24. Also as a result of the absorber being on top of the light pipe, thermal energy tends to concentrate adjacent the upper end thereof providing adjacent heating through convection to the portion of the coil 24 adjacent the top of the light pipe. Thus, as can be seen, the light pipe acts as a trap for solar radiation; permitting the passage of the visible spectrum of electromagnetic radiation initiated by the sun to engage the absorber 20, while absorbing the major portion of any resulting infrared radiation into the interior surface 22 of the light pipe.

It is to be understood that the terms solar radiation and electromagnetic radiation have been used interchangeably to refer to the energy or radiation emitted by the sun, however, the apparatus disclosed in accordance with the invention may also be used to trap and absorb energy emitted from other bodies as well.

While a preferred embodiment of the invention has been described using specific terms, such description is for illustrative purposes only, and it is to be understood that changes and variations may be made without departing from the spirit or scope of the following claims.

What is claimed is:

1. A solar energy trap for trapping and absorbing electromagnetic radiation waves emitted from the sun and for converting the radiation waves into thermal energy for heating a fluid comprising:
   a. a source of fluid;
   b. an elongated tubular light pipe having opened ends and positioned so as to receive said radiation waves through one end thereof;
   c. a highly reflective surface coating provided on the interior surface of said light pipe, said surface coating having a low absorption factor for the visible portion of the electromagnetic radiation spectrum and having a high absorption factor for the infrared portion of the electromagnetic radiation spectrum for reflecting said visible portion and for absorbing infrared radiation generated within said energy trap for conversion into thermal energy by said light pipe;
   d. a tubular coil having a plurality of spaced turns encircling said light pipe, for conveying said fluid in a heat exchanging relationship with said light pipe for permitting said thermal energy to be absorbed by said fluid;
   e. absorber means comprising a substantially planar tubular coil for conveying said fluid carried on said open end of said pipe opposite to said open end for receiving said radiation waves therethrough; said absorber means including a coated surface having a high absorption factor for absorbing the visible portion of the electromagnetic radiation spectrum of said radiation waves and for conversion of said radiation waves into thermal energy;
   f. said tubular coil encircling said light pipe being connected to said coil of said absorber means;
   g. whereby the light pipe acts as a trap, directing the visible portion of the electromagnetic radiation spectrum to said absorber means for conversion therein to thermal energy to be absorbed by said fluid conveyed in heat exchange relationship with said absorber means.

2. The solar energy trap of claim 1 wherein the diameter of said planar tubular coil of said absorber means is substantially as large as the diameter of said light pipe at said open end at which said absorber means is carried.

3. The solar energy trap of claim 1 including a plurality of mirrors mounted circumferentially around said open end of said light pipe for receiving radiation waves therethrough, whereby said mirrors direct said radiation toward the longitudinal axis of said pipe.

4. The solar energy trap of claim 1 further comprising a layer of insulation surrounding said tubular coil encircling said light pipe for reducing the loss of thermal energy from said fluid.

* * * * *